United States Patent [19]
Venters

[11] Patent Number: 5,515,371
[45] Date of Patent: May 7, 1996

[54] TIMESLOT INTERLEAVING DELAY COMPENSATION (BONDING) MECHANISM FOR TIME DIVISION MULTIPLEXED DIGITAL COMMUNICATION NETWORK

[75] Inventor: W. Stuart Venters, Huntsville, Ala.

[73] Assignee: Adtran, Huntsville, Ala.

[21] Appl. No.: 329,449

[22] Filed: Oct. 26, 1994

[51] Int. Cl.$^6$ .................................................. H04Q 11/04
[52] U.S. Cl. ................................ 370/66; 370/68; 370/108
[58] Field of Search ........................... 370/66, 58.1, 58.2, 370/59, 68, 79, 85.13, 100.1, 102, 103, 105.1, 106, 108, 109; 340/825.01, 825.02, 825.14, 825.2, 825.61; 327/141, 153, 261, 271; 375/354, 356, 371

[56] References Cited

U.S. PATENT DOCUMENTS

| | | | |
|---|---|---|---|
| 4,535,446 | 8/1985 | Mountain | 370/68 |
| 4,811,367 | 3/1989 | Tajiha | 370/108 |
| 5,033,044 | 7/1991 | Williams et al. | 370/100.1 |
| 5,305,322 | 4/1994 | Kabaya | 370/100.1 |
| 5,307,380 | 4/1994 | Kume | 370/108 |
| 5,359,602 | 10/1994 | Diaz et al. | 370/100.1 |

*Primary Examiner*—Alpus H. Hsu
*Assistant Examiner*—Ricky Q. Ngo
*Attorney, Agent, or Firm*—Charles E. Wands

[57] ABSTRACT

In a time division multiplexed digital communication network through which time division multiplexed data signals are routed over respectively different transmission paths of the network, the paths having respectively different transmission delays, to a bonding receiver at a destination end of the network, the bonding receiver including a digital signal processor for controlling the operation of the bonding receiver, bonding compensation that is normally carried out entirely by the digital signal processor is transferred from the digital signal processor to an auxiliary delay path, which is coupled to the receive path from the network. The auxiliary delay path is controlled by the direct memory access (DMA) functionality of the digital signal processor to transfer selected data time slots through the auxiliary delay path. The output of the auxiliary delay path is controllably multiplexed with undelayed time slots, so as to be re-injected into the receive path and time division multiplex aligned with and synchronously interleaved with the slower channel's time slots upstream of the input of the digital signal processor.

45 Claims, 5 Drawing Sheets

Improved Bonding Receiver (Prior Art)

Data Communication System (Prior Art)

Bonding Receiver

Transmission Path B 1 [24]

Transmission Path B 2 [24]

TDM B 1 / B2  Interleaved

TDM B1 / B2

Delay Due To Network

Improved Bonding Receiver

Delay Re-Alignment

| Source Add Ctr 64 | Dma Op | Dest Add Ctr 65 | Dma Op |
|---|---|---|---|
| | [C 1] | | [C 2] |
| 27 (LSB=1) | Read New Data (b 14) From In Reg Temp Hold Reg — 62 | 34 (LSB=∅) | Write New Data (b 14) From Temp Hold Reg 62→Mem Address — 34 |
| | [C 3] | | [C 4] |
| 28 (LSB=∅) | Read Stored Data (b11) in Mem Add (28) →Temp out Hold Reg — 62 | 35 (LSB=1) | Write Data (b 11) From Temp Hold Out Reg 62→Out Reg — 67 |
| | [C 1] | | [C 2] |
| 29 (LSB=1) | Read New Data (b 15) From in Reg — 66 →Temp In Hold Reg — 62 | 36 (LSB=1) | Write New Data (b 15) from Temp Hold Reg — 62 →Mem Add 36 |
| | [C 3] | | [C 4] |
| 30 (LSB=∅) | Read Stored Data (b 12) In Mem Add (30) →Temp Out Hold Reg — 62 | 37 (LSB=∅) | Write Data (b 12) From Temp Hold Out Reg — 62 Out Reg — 67 |

Memory 63 Address Space

| | Address | Contents |
|---|---|---|
| | 27 | |
| | 28 | b 11 |
| | 29 | |
| 3 Byte Delay | 30 | b 12 |
| | 31 | |
| | 32 | b 13 |
| | 33 | |
| | 34 | b 14 |
| | 35 | |
| | 36 | b 15 |

Figure 8

TIMESLOT INTERLEAVING DELAY COMPENSATION (BONDING) MECHANISM FOR TIME DIVISION MULTIPLEXED DIGITAL COMMUNICATION NETWORK

FIELD OF THE INVENTION

The present invention relates in general to digital communication systems and is particularly directed to a delay compensation mechanism for ensuring timeslot interleaving alignment of time division multiplexed data signals that have been routed over respectively different transmission paths of a digital communication network, which paths have respectively different transmission delays.

BACKGROUND OF THE INVENTION

An expedient technique for obtaining high bandwidth use of a digital telephone network is to first split the data into multiple time division multiplexed (TDM) timeslots, route respectively different timeslots of data over reduced bandwidth data circuits through the network, and then to merge or interleave the time slots from each data circuit at the receiving end of the link. Although successive time slot bytes of each circuit are synchronized to a common clock signal (e.g. 8 KHz for ISDN (integrated services digital network) frames), different circuits can be expected to be routed over respectively different transmission paths through the network.

Because the transmission delay for any given path is not necessarily the same as that of any other path through the network, there is a high likelihood that the respective data bytes (time slots) of different circuits will not arrive at the destination end of the network in the same time-aligned fashion as they were injected at the source end of the network. To compensate for this misalignment problem, a technique commonly referred to as 'bonding' is carried out by a digital signal processor at the receive end of the link.

More particularly, bonding is the process of linking or joining multiple data circuits that have been routed over respective communication paths that do not necessarily have the same transmission delay, such that the data from the respective circuits properly interleave at the destination end of the network. Namely, bonding is operative to preserve the same order and time slot synchronization, as originally multiplexed at the upstream or source end of the network. As pointed out above, the bonding process typically is performed by a digital signal processor at the destination end of the network, the processor being coupled to receive respectively different delayed channels of data through synchronous communication controllers (SCCs) of a bonding receiver to which the output of the network is coupled.

Referring to FIG. 1, the overall configuration of a conventional time division multiplexed (TDM) digital communication system between respective customer sites (transmitter site 1 and receiver 2) is diagrammatically illustrated as comprising a bonding transmitter 3, which connects transmitter site 1 to an upstream side 22 of a network 20, and a bonding receiver 4, which connects receiver site 2 to a downstream side 24 of network 20. As a non-limiting example, bonding receiver 4 may comprise an ISU-128 (TM Adtran Corp., Huntsville, Ala.) ISDN terminal adaptor, diagrammatically illustrated in FIG. 2 as comprising respective serial communication controllers (SCCs) 11 and 13, which are respectively coupled through a network link 21 to a network interface 6, and to a digital communications link 23 which serves a user's computer equipment 25 at the terminal side of the interface. SCCs 11 and 13 and are controlled by a resident communications processor 17, such as that contained in a Motorola 68302 microcontroller.

The network proper is shown at 20 and, as described above, is operative to route respectively different circuits of data, supplied to an upstream side 22, over reduced bandwidth time division multiplexed (TDM) data paths, to a downstream or receive path side 24. Receive path side 24 is coupled via network interface 6 to network link 21. At each of the upstream side 22 and the downstream side 24 of the network 20, successive time slots of each circuit are synchronized to a common clock signal (e.g. 8 KHz for 56 KHz or 64 KHz for ISDN circuits).

As diagrammatically illustrated in the timing diagram of FIG. 3, different circuits B1, B2 of interleaved time slots (successive TDM bytes) b11, b12, b13, . . . , b21, b22, b23 can be expected to be routed over respectively different transmission paths through network 20. Because the transmission delay for any given path is not necessarily the same as that of any other path through the network, there is a high likelihood that the time slots b11, b12, b13, . . . of data circuit B1 will not arrive at the receive side 24 of the network 20 in their original properly time-aligned, interleaved fashion with time slots b21, b22, b23, . . . of data circuit B2.

This expected temporal offset or network path delay is diagrammatically shown in FIG. 4, which, for purposes of providing a non-limiting example, illustrates the case where the routing path through network 20 has caused the time slots b2i of data circuit B2 to be delayed by three bytes relative to the time slots b1i of data circuit B1. In the illustrated example, such a three byte network path delay causes time slot b21 of circuit B2 to be clocked at the time of time slot b14 of data circuit B1. It can be seen that if the circuits B1 and B2 were simply recombined, data byte b21, rather than being interleaved between data bytes b11 and b12 of circuit B1, in accordance with its original TDM format, would be interleaved between data bytes b14 and b15 of circuit B1, yielding a corrupted data byte sequence. To avoid this problem and properly recover the originally interleaved data byte sequence, it is necessary to compensate for the transmission path delay between the time slots of circuit B1 and those of circuit B2.

As noted above, such compensation, referred to as bonding, is customarily performed in communications processor 17, which measures the relative delay between the B1 and B2 circuits, and then inserts the necessary amount of delay in that path (here circuit B1) whose transmission channel delay is faster than the slower channel (here B2). A principal shortcoming of this conventional approach is the fact that a significant portion of the available processing cycles of communications processor 17 must be dedicated to adjust that delay through associated memory. Moreover, because the delay path involves the manipulation of the data through the processor 17, a substantial transport delay penalty is incurred. In addition, such preliminary processing (bonding compensation) of the data frames output by the network means that the SCC 11 of the bonding receiver is precluded from performing some other function such as high level data link control (HDLC) reception.

SUMMARY OF THE INVENTION

In accordance with the present invention, these problems are successfully addressed by transferring the bonding compensation operation from within the digital signal processor to an auxiliary delay path, which is coupled to the receive path from the network to the SCC in the bonding receiver, and using the direct memory access (DMA) functionality of the digital signal processor to operate the auxiliary delay path to transfer selected data time slots through the auxiliary delay path. The output of the auxiliary delay path is controllably multiplexed with undelayed time slots, so as to be re-injected into the receive path and time division multiplex aligned with and synchronously interleaved with the slower channel's time slots upstream of the input of the SCC.

To this end, the DMA-controlled auxiliary delay path mechanism of the present invention comprises an input (serial-parallel) register, a controlled delay unit, an output (parallel-serial) register, and a multiplexer. The serial-parallel input register has its input coupled to the data receive path from the network, and is operative under DMA control to temporarily store data bytes associated with successive time slots of a relatively faster channel. Similarly, the parallel-serial output register has its output coupled to a first input of the multiplexer, a second input to which is coupled to the data receive path from the network. The output of the multiplexer is coupled to the input SCC.

Like the serial-parallel input register, the parallel-serial output register is operative under DMA control to temporarily store data bytes associated with successive time slots of the relatively faster channel. However, the parallel-serial output register is downstream of the delay unit, so that it temporarily stores data bytes that have been subjected to the delay imparted by the delay unit.

DMA-controlled operation of the auxiliary path through the serial-parallel input register, the delay unit and the parallel-serial output register, causes each (time slot) byte of the faster data channel to be controllably diverted from the receive path and delayed by an amount commensurate with the relative delay of the slow channel bytes. The delayed bytes output from the auxiliary delay path are then controllably alternately switched through the multiplexer, together with the undelayed time slot bytes of the slower channel, and are re-injected into the receive path and time division multiplex-aligned with and synchronously interleaved with the slower channel's time slots upstream of the input of the SCC.

The reduced complexity architecture of the delay unit comprises a DMA controller and associated memory. The DMA controller has a source address counter and a destination address counter. The source address counter points to a source location (an input register or memory address) from which data is to be read. The destination address counter points to a destination location (memory address or output register) to which data is to be written. The value of the least significant bit of the respective source or destination address counter (which defines whether the numerical count value of that counter is either odd (LSB=1) or even (LSB=0)) is decoded by the DMA controller to determine whether an I/O register (input register in the case of the source address counter, and output register in the case of the destination address counter) is accessed or whether an address in memory is accessed. Whenever the DMA controller performs a data transfer, the corresponding address counter employed for that cycle is incremented.

The DMA controller further includes a DMA enable input, which, when asserted by the communication processor, causes a DMA transfer cycle to be executed in synchronization with the common network clock. Transfers between the serial-parallel input register, which latches successive bytes of data on the receive link, and memory are accomplished by means of a temporary input holding register.

Transfers between memory and the parallel-serial output register are effected by means of a temporary output holding register. In addition, there is a common temporary holding register in the DMA controller. Four DMA transfer cycles are required to implement the necessary frame delay for one byte of data.

For a first (or input read cycle) of the four cycles of a frame delay operation, the count value of the source address counter is used for a data path input transfer from the temporary input holding register to the common temporary holding register. During this read cycle, with the numerical count value of the source address counter being odd/even (LSB=1/0), the DMA controller causes the data byte value latched from the serial-parallel input register (to which the digital data path from the network is coupled) to be transferred into the common temporary input holding register, and the source address counter to be incremented. For the second or memory write cycle, the destination address counter is employed to specify where in memory the input data value is to be written. During this cycle, the data value in the common temporary holding register is transferred into the memory address pointed to by the contents of the destination address counter, the numerical contents of which are even/odd (LSB=0/1). Following this transfer, the destination address counter is incremented.

For the third or memory read cycle, during which the incremented numerical count value of the source address counter is even/odd (LSB=0/1), the data value stored in the memory address pointed to by the source address counter is transferred from memory to the common temporary holding register, and the source address counter is incremented. At the fourth or output cycle, where the incremented numerical contents of destination address counter is odd/even (LSB=1/0), the data value stored in the common temporary holding register is written into the temporary output holding register, so that it may be multiplexed with the data on the receive path to the network interface. Following this transfer, the destination address counter is incremented.

Upon completion of the fourth cycle, the DMA controller will have effectively caused a respective data byte of the faster channel to have been delayed by a delay that brings the faster and slower data circuits into proper TDM interleaving alignment, just as though network had provided the same amount of delay for each circuit.

BRIEF DESCRIPTION OF THE DRAWINGS

FIG. 8 shows data transfer operations associated with the contents of respective memory locations of memory 63 and examples of count values of respective source and destination address counters 64 and 65 of DMA controller 61 of FIG. 6.

DETAILED DESCRIPTION

Figure 1:
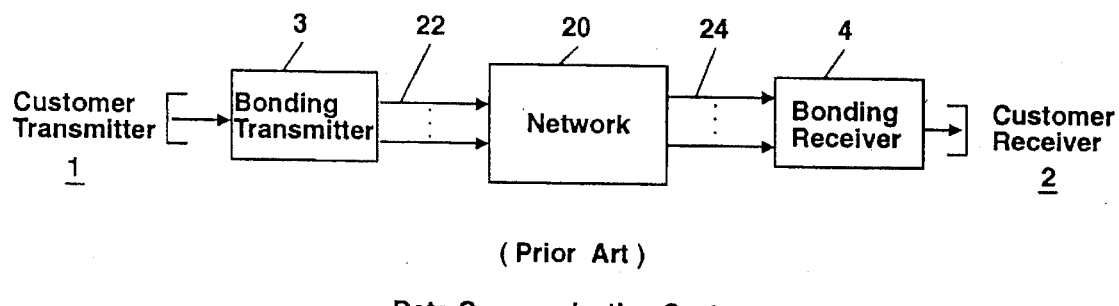
FIG. 1 diagrammatically shows the overall configuration of a conventional digital data communications system.
Figure 2:
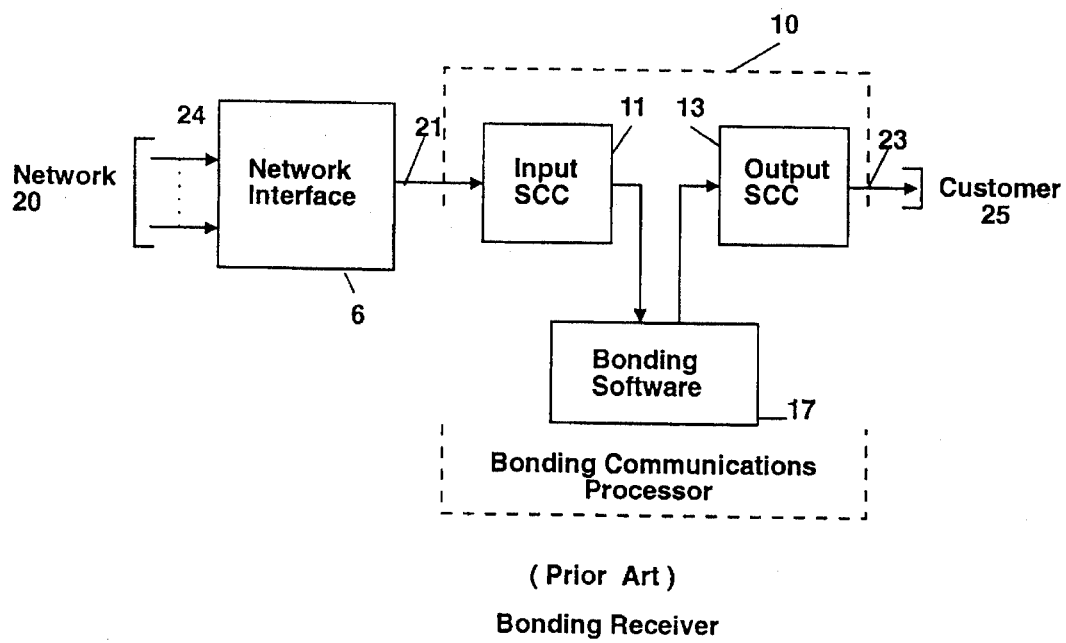
FIG. 2 diagrammatically shows the configuration of a bonding receiver.
Figure 3:
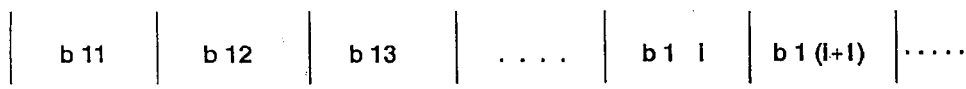
FIG. 3 is a timing diagram diagrammatically illustrating different circuits B1, B2 of interleaved data byte time slots (successive TDM bytes) b11, b12, b13, ..., b21, b22, b23 that have been de-interleaved and routed over respectively different transmission paths through the network 20 of FIG. 1.
Figure 3:
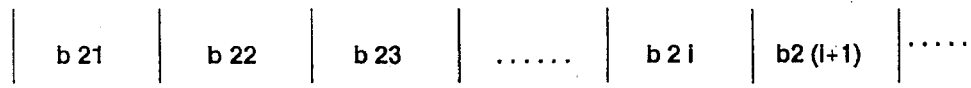
Figure 3:
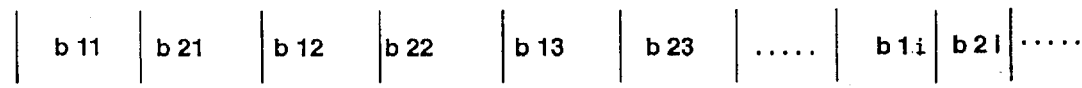

Before describing in detail the new and improved bonding delay compensation mechanism in accordance with the present invention, it should be observed that the present invention resides primarily in what is effectively a replacement of the existing bonding routine, that is executed entirely within the digital signal processor of the network interface, by a DMA-controlled auxiliary routing path. This DMA-controlled auxiliary routing path is operative to route and controllably delay selected (faster channel) data time slots from the network, and then multiplex such delayed time slots with undelayed (slower channel) time slots, so that the delayed time slots are reinjected into the receive path in a manner which is both time division multiplex aligned with and synchronously interleaved with the slower channel's time slots upstream of the input of the SCC.

The configuration of such an auxiliary routing mechanism, the manner in which it is incorporated into the receive path to the network interface, and the manner in which the digital signal processor's DMA controller is employed to carry out the controlled routing and delay function have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

As noted above, in connection with the description of FIGS. 1–4, bonding compensation is customarily performed in the network interface's communications processor, which measures the relative delay between the channels, and then inserts the necessary amount of delay in that circuit whose transmission channel is faster than the slower channel. A shortcoming of this conventional approach is the fact that a significant portion of the available processing cycles of communications processor must be dedicated to measure each channel's delay and then adjust that delay through associated memory. Moreover, because the delay path involves the manipulation of the data through the processor, a substantial transport delay penalty is incurred.

Figure 5:
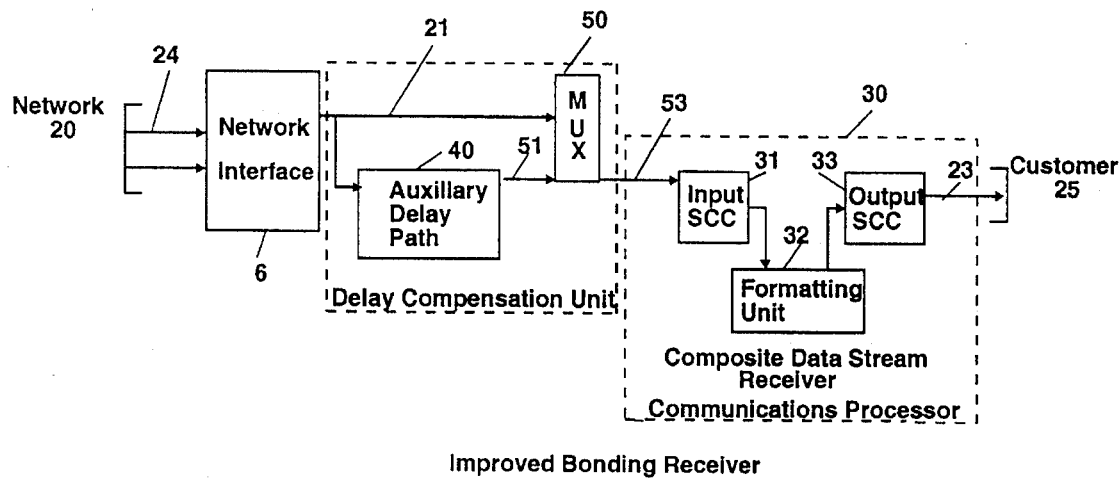
FIG. 5 diagrammatically illustrates an improved bonding receiver in accordance with the present invention.
Figure 6:
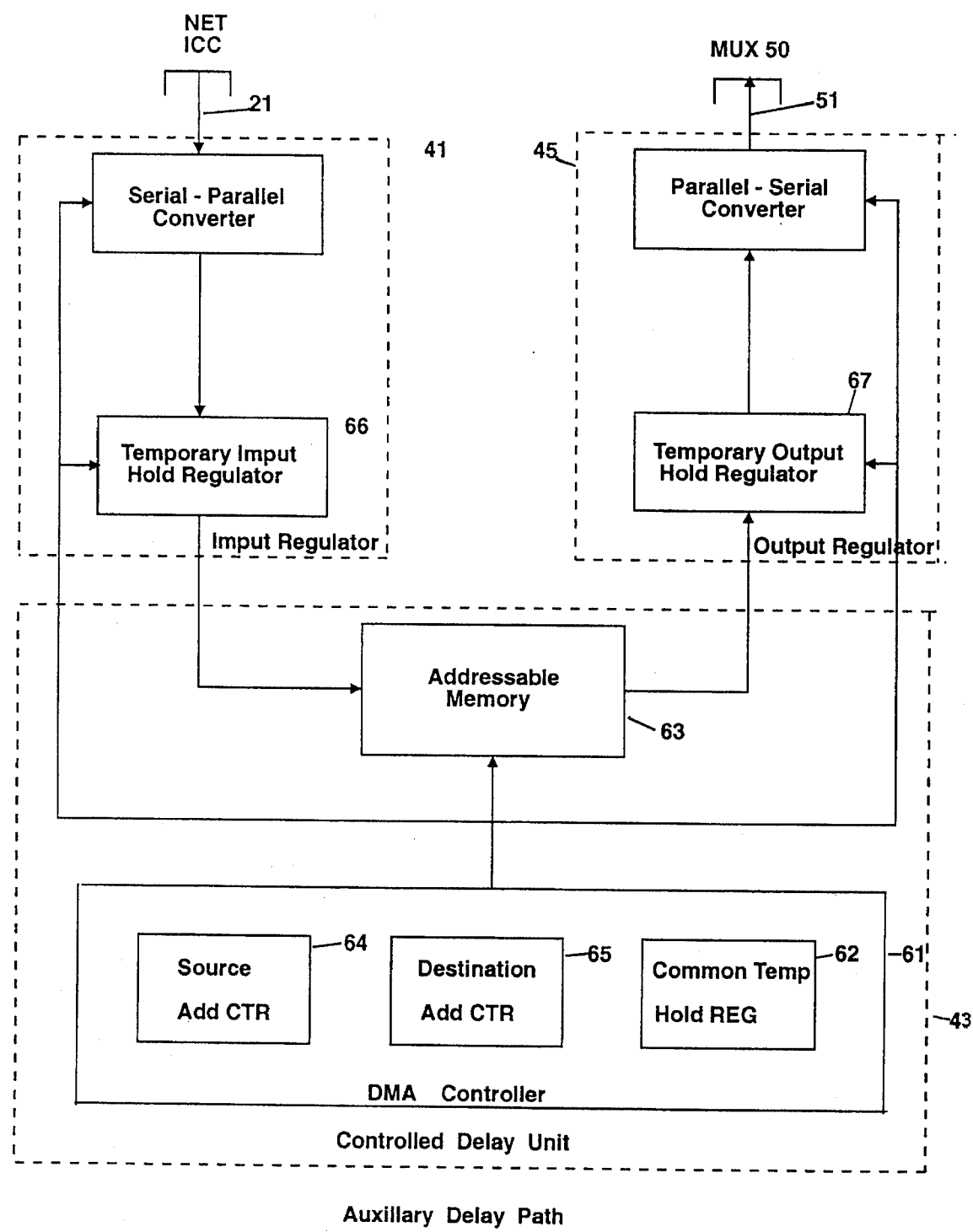
FIG. 6 diagrammatically illustrates an auxiliary delay path mechanism in accordance with the present invention.

To solve these problems the present invention installs a DMA-controlled auxiliary delay path mechanism, diagrammatically illustrated in FIGS. 5 and 6, in the receive path from the network upstream of the input SCC. The (DMA-controlled) auxiliary delay path mechanism comprises an input (serial-parallel) register 41, a controlled delay unit 43, an output (parallel-serial) register 45, and a multiplexer 50. Serial-parallel input register 41 has its input coupled to the data receive path 21 from the network 20 and is operative under DMA control to temporarily store time slots associated with successive time slots of a relatively faster channel (circuit B1 in the present example) into temporary input holding register 66.

Similarly, parallel-serial output register 45 has its output coupled to a first input 51 of multiplexer 50, a second input 52 of which is coupled to the data receive path 21 from the network 20. The output of multiplexer 50 is coupled over line 53 to composite data stream receiver 30. Like serial-parallel input register 41, parallel-serial output register 45 is operative under DMA control to temporarily store data bytes associated with successive time slots of the relatively faster channel. However, parallel-serial output register 45 is downstream of delay unit 43, so that it temporarily stores data bytes that have been subjected to the delay imparted by delay unit 43.

Figure 4:
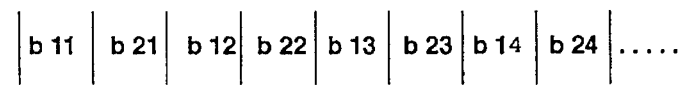
FIG. 4 diagrammatically shows a temporal offset or network path delay for the case where the routing path through the network 20 of FIG. 1 has caused the time slots b2$i$ of a data circuit B2 of the timing diagram of FIG. 3 to be delayed by three bytes relative to the time slots b1$i$ of data circuit B1.
Figure 4:
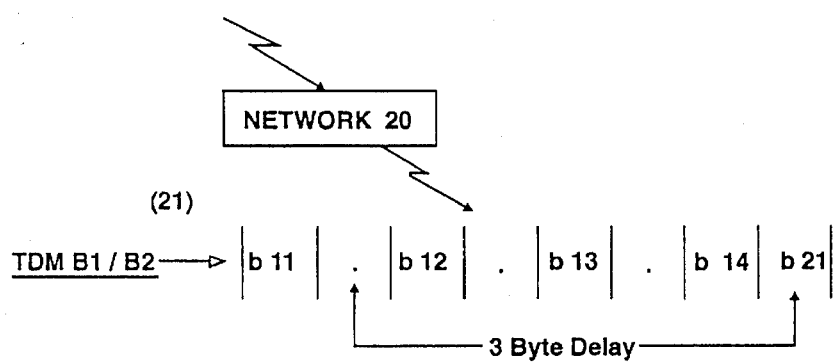

By means of the auxiliary delay path 40 through serial-parallel input register 41, delay unit 43 and parallel-serial output register 45, each (time slot) byte (b1$i$) of the faster data circuit (B1) is controllably diverted from the receive path 21 and delayed by an amount commensurate with the relative delay of the slow channel bytes (b2$i$). (In the present non-limiting example, this delay is three bytes, as shown in FIG. 4, referenced supra.) The output (delayed bytes b1$i$) of the auxiliary delay path 40 are then controllably alternately switched through multiplexer 50, together with undelayed time slot bytes (b2$i$) of the slower channel (circuit B2), so as to be re-injected into the receive path 53 and time division multiplex-aligned with and synchronously interleaved with the slower channel's time slots upstream of the input of the SCC 31.

As described briefly above, to implement delay unit 43, the present invention takes advantage of the availability of the DMA controller and associated memory resident within the bonding receiver's digital signal processor 30. This reduced complexity architecture is diagrammatically illustrated in FIG. 6 as comprising a DMA controller 61 and memory 63. Within DMA controller 61 there are a source address counter 64, a destination address counter 65, and a common temporary holding register 62. Source address counter 64 points to that address in memory 63, from which data is to be accessed. Conversely, destination address counter 65 points to that address in memory 63 to which data is to be written. As will be described, whenever the DMA controller 61 performs a data transfer, the corresponding address counter employed for that cycle is incremented.

DMA controller 61 transfers data from fixed size buffers, and hence must be restarted periodically in order to provide a continuous delay function. In the Motorola 68302 microcontroller, identified above, DMA restarts are interrupt driven, so that DMA controller 61 performs a single contiguous data transfer from the location pointed to by the source address counter 64 to the location pointed to by the destination address counter 65 in response to an interrupt. Since normal interrupt processing causes an unacceptable delay in restarting the DMA controller, the DMA restart routine is preferably placed in a shorter response time non-maskable interrupt handler to avoid this problem.

Transfers between the temporary input holding register 66, which latches successive bytes of data on link 21, and memory 63 are accomplished by means of a common temporary holding register 62. Similarly, transfers between memory 63 and temporary output holding register 67 are accomplished by means of the same common temporary holding register 62. With the input register→common holding register→ memory→common holding register→output register delay path architecture of FIG. 6, four DMA transfer cycles, to be described in detail below, are required to implement the necessary delay. The amount of delay imparted by delay unit 43 corresponds to the difference between the settings at which source and destination address counters 64 and 65, respectively, are initialized. The difference corresponds to the sum of the number of source or destination transfer cycles per frame delay and the number of bytes of the channel delay. For the current example of a three byte delay between circuits B1 and B2, and two source and destination transfer cycles to implement the delay, this means that the difference between source address counter 64 and destination address counter 65 is a count value of seven.

As pointed out above, the value of the least significant bit of the source address counter 64 or destination address counter 65 (which defines whether the numerical count value of that counter is either odd (LSB=1) or even (LSB=0)) is used to control whether an I/O register (input register 66 in the case of the source address counter 64, and output register 67 in the case of the destination address counter 65) is accessed, or whether an address in memory 63 is accessed. For purposes of providing a non-limiting example, an LSB value of 1 will be used to indicate that the transfer is for a register (66 or 67), while an LSB value of 0 will be used to indicate that the transfer is for memory 63.

For a first of the four cycles of a frame delay operation, termed an input cycle (C1), depending upon count values at initialization, the odd (LSB=1) address count value of source address counter 64 is used to define a data path input transfer from input register 66 to temporary holding register 62. Namely, during a read cycle, the value of the LSB chosen (1) for an input register access will cause the DMA controller to transfer the data byte value currently latched in temporary input holding register 66 into common temporary holding register 62. Following this cycle, the source address counter 64 will be incremented.

For the second cycle, termed a memory write cycle C2, destination address counter 65 is employed to specify where in memory the input data value is to be written. Namely, during the second cycle C2 the data value that has been transferred to temporary holding register 62 during the first cycle C1 is transferred into the address in memory 63 pointed to by the contents of the destination address counter 65. As described above, the value of the LSB (0) of the numerical contents of the destination address counter 65 is used to delineate that the destination is memory 63. Following this cycle, the destination address counter 65 will be incremented.

For the third or memory read cycle C3, during which the LSB of the (incremented) numerical count value of source address counter 64 is now opposite (LSB=0) to that (LSB=1) of the first cycle C1, the data value stored in the address in memory 63 pointed to by source address counter 64 is transferred from memory 63 to temporary holding register 62 and the source address counter is incremented. At the fourth or output cycle C4, where which the LSB of the (incremented) numerical count value of destination address counter 65 is now opposite (LSB=1) to that (LSB=0) of the second cycle C2, the data value stored in temporary holding register 62 is written into temporary output register 67 and the destination address counter 65 is incremented.

Figure 7:
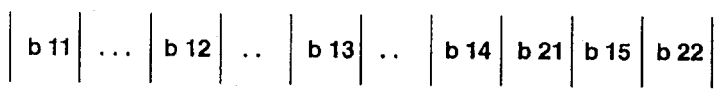
FIG. 7 is a timing diagram illustrating the delay compensation of the delayed data of FIG. 4.
Figure 7:
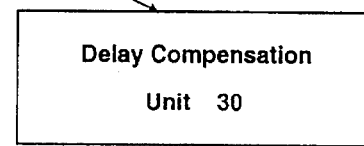
Figure 7:
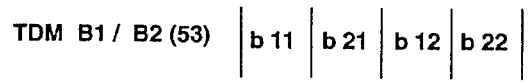

The operation of the DMA controller-driven delay mechanism shown in FIGS. 5 and 6, described above, may be understood with reference to the timing diagram of FIG. 7 and FIG. 8, which shows data transfer operations associated with the contents of respective memory locations of memory 63 and the count values of respective source and destination address counters 64 and 65 of DMA controller 61. For purposes of providing a non-limiting example consistent with the above described control values of the LSB of each of the source and destination address counters, it will be assumed that the current value of source address counter 64 is '27' (LSB=1), and the current value of destination address counter 65 is '34' (LSB=0). As shown in FIG. 8, the next or incremented address location '28' of memory 63 contains a previously stored data byte b11, which, in the present example of a three byte delay between slower circuit B2 and faster circuit B1 (in which byte b11 is contained), is to be delayed by a three byte delay relative its associated byte b21 of slower circuit B2, as illustrated in the timing diagram of FIG. 7.

As described above, during the first or input read cycle C1, since the LSB of the current address count value '27' of source address counter 64 is '1', a data path input transfer is to be executed from temporary input holding register 66 to common temporary holding register 62. Namely, upon decoding a '1' in the LSB of the source address counter 64, DMA controller causes the data byte value currently latched into input register 66 (data byte value b14) to be transferred into temporary holding register 62. Source address counter 64 is then incremented (from its current value of '27' to a new value of '28').

At the next (second or memory write) cycle C2, destination address counter 65 is employed. In accordance with the convention of the non-limiting example, defined above, since the LSB of the numerical value currently stored in destination address counter 65 is '0', DMA controller 61 causes the data value (b14) in temporary holding register 62 to be transferred into the address in memory 63 pointed to by destination address counter. Thus, data value b14 is loaded into memory address '34' of memory 63. Destination address counter 65 is then incremented (from its current value of '34' to a new value of '35').

At the next (third or memory read) cycle C3, since the LSB of the previously incremented count value '28' of source address counter 64 is '0', DMA controller 61 causes the data value stored in the memory address pointed to by source address counter 64 (the address corresponding to count value '28') to be transferred from memory 63 to temporary holding register 62. Since the current contents of memory location '28' is the data value b11, b11 is read out from memory 63 and stored in temporary holding register 62. Source address counter 64 is then incremented (from its current value of '28' to a new value of '29').

At the fourth (or output) cycle C4, since the LSB of the current value '35' of the destination address counter 65 is '1', DMA controller 61 is operative to transfer the data value stored in temporary holding register 62 into output register 67. Destination address counter 65 is then incremented (from its current value of '35' to a new value of '36'). As the data value transferred from holding register 62 to output register 67 is the data byte b11, b11 will now be applied to the first input 51 of multiplexer 50. Since this data byte has been delayed by three bytes (b11–b14), it is now effectively in time division multiplex alignment with its associated byte b21 of circuit B2, which is the next byte supplied on network receive path 21 to the second input 52 of multiplexer 50.

As the select input to multiplexer 50 successively switches between inputs 51 and 52, bytes b11 and b21 of interleave circuits B1 and B2 are sequentially output from multiplexer 50 in their original time division multiplexed sequence over line 53 to SCC 31. Namely, upon completion of the fourth cycle C4, DMA controller 61 will have effectively caused a respective data byte of the faster channel frame to have been delayed by the requisite delay (three bytes in the present example) that brings the faster (B1) and slower (B2) data frames into proper TDM interleaving alignment, just as though network 20 had provided the same amount of delay for each frame.

At the next or first cycle C1 of the next DMA four cycle sequence, since the LSB of the numerical value of source address counter 64 is '1' (having been incremented to a value of '29'), DMA controller 61 causes a new data byte latched into input register 66 (data byte b15) to be transferred into temporary holding register 62, and the above sequence repeats for transferring data byte b12 from memory 63 to output register 67 and loading into memory the new data byte b15.

As will be appreciated from the foregoing description, the present invention effectively obviates the above-discussed shortcomings of conventional frame bonding, which use substantially the entirety of the processing power of the bonding receiver's communications processor to compensate for differential frame delay resulting from respectively different paths of the network. Rather than perform the entire bonding process within the digital signal processor at the receive end of the network, which would not only occupy a significant portion of the digital signal processor's available processing cycles, but would impose a substantial transport delay penalty through the processor and its associated memory, the present invention transfers the bonding operation from the digital signal processor to an auxiliary delay path. The auxiliary delay path is operated by the direct memory access (DMA) functionality of the digital signal processor, thereby freeing up the communications processor to run its network interface operating system, without having to perform bonding.

It should also be noted that although the foregoing description explains how the invention may be applied to a non-limiting example of two channels (circuits), one of which is the relatively faster channel and the other of which is the relatively slower channel, the present invention is not limited to this or any other number. In general the invention may be applied to an N number of channels, where N is an integer greater than one. In the general case, the slowest of the N channels serves as the reference or relatively slow channel compared with the remaining N−1 relatively faster channels. For these remaining N−1 channels, N−1 delay units are employed to provide the requisite delays relative to the slowest channel, using the methodology described above.

In addition, it may happen in the course of transmission that the order of the channels is changed. While this is trivial in the case of two channels (for example, an alternating sequence of two channels A and B—either as A—B—A—B—A—B— etc., or B—A—B—A—B—A—B etc., appears the same. For more than two channels, the change in order must be realigned. In this case, with the provision of N−1 delay units, the signal flow paths through the output registers of selected ones of the delay units may be interchanged or swapped, so as to realign the channels. For example, in the case of an original transmission order of three channels A—B—C, if channels B and C are received in a reverse order, so that the received sequence becomes A—C—B, the output registers for the two delay units may be swapped. Namely, in this case, the output register associated with the first delay unit is used as the output register associated with the second delay unit, and vice versa.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A bonding delay compensation mechanism for effecting timeslot interleaving alignment of time division multiplexed data signals that have the same transmission rate and have been routed over respectively different transmission paths of a digital communication network at said same transmission rate, which paths have respectively different transmission delays, said bonding delay compensation mechanism comprising a multiplexer coupled in a receive data path from said digital communication network to a bonding receiver, and an auxiliary delay path, which is coupled to said receive data path from said digital communication network and which is controllably operative to delay selected time slots of said time division multiplexed data signals, which are then coupled to said multiplexer, so as to be multiplexed with other time slots of time division multiplexed data signals conveyed over said receive data path, and thereby re-injected into said receive data path and time division multiplex-aligned with and synchronously interleaved with said other time slots of said time division multiplexed data signals upstream of an input to said bonding receiver.

2. A bonding delay compensation mechanism according to claim 1, wherein said auxiliary delay path is controlled by a direct memory access (DMA) controller of a bonding receiver digital signal processor.

3. A bonding delay compensation mechanism according to claim 2, wherein said auxiliary delay path comprises a cascaded arrangement of an input register, a controlled delay unit and an output register, each of which is controlled by said DMA controller of said digital signal processor.

4. A bonding delay compensation mechanism according to claim 3, wherein said input register has an its input coupled to said data receive path from said network, and is operative under DMA control to temporarily store data bytes associated with successive time slots of a relatively faster channel.

5. A bonding delay compensation mechanism according to claim 4, wherein said output register has its output coupled to a first input of said multiplexer, a second input to which is coupled to said data receive path from said network, said multiplexer having an output coupled to said bonding receiver, said output register being operative under DMA control to temporarily store data associated with successive time slots of said relatively faster channel, so that said output register stores data that have been subjected to the delay imparted by said delay unit.

6. A bonding delay compensation mechanism according to claim 5, wherein said auxiliary path through said input register, said delay unit and said output register is operative to cause each time slot of said faster channel to be controllably diverted from said receive data path and delayed by an amount commensurate with the relative delay of a relatively slower transmission path through said network.

7. A bonding delay compensation mechanism according to claim 6, wherein said DMA controller is operative to cause each time slot byte of said faster channel to be controllably diverted from said receive data path delayed by said commensurate amount and re-injected into said receive data path in four DMA transfer cycles.

8. A bonding delay compensation mechanism according to claim 5, wherein said digital signal processor includes memory, and wherein said DMA controller has a source address counter and a destination address counter, said source address counter pointing to one of said input register and an address in said memory from which data is to be accessed, said destination address counter pointing to one of an address in said memory and said output register to which data is to be written.

9. A bonding delay compensation mechanism according to claim 8, wherein the amount of delay imparted to said faster channel by said auxiliary delay path is defined in accordance with the difference between count values of said source address counter and said destination address counter.

10. A bonding delay compensation mechanism according to claim 8, wherein said auxiliary delay path further includes and a temporary holding register, and wherein DMA-controlled data transfers between said input register and said memory are effected through said temporary holding register, and wherein DMA-controlled data transfers between said memory and said output register are effected through said temporary holding register.

11. A bonding delay compensation mechanism according to claim 10, wherein, during a first DMA-transfer cycle, the count value stored in said source address counter is defined so as to cause said DMA controller to effect a data transfer from said register to said temporary input holding register.

12. A bonding delay compensation mechanism according to claim 11, wherein, during a second DMA-transfer cycle, said DMA controller is operative to effect a data transfer from said temporary holding register to that location in said memory specified in said destination address counter.

13. A bonding delay compensation mechanism according to claim 12, wherein, during a third DMA-transfer cycle, the count value stored in said source address counter is defined so as to cause said DMA controller to effect a data transfer from that location in memory specified by said source address counter to said temporary holding register.

14. A bonding delay compensation mechanism according to claim 13, wherein, during a fourth DMA-transfer cycle, the count value stored in said destination register is defined to cause said DMA controller to effect a data transfer from said temporary holding register to said output register.

15. A bonding delay compensation mechanism according to claim 14, wherein said DMA controller is operative to increment said source and destination address counters during alternate ones of said DMA-transfer cycles.

16. A delay mechanism for imparting a prescribed delay to a digital data stream being transmitted over a digital data communication path, comprising a cascaded arrangement of an input register, a controlled delay unit and an output register, said cascaded arrangement being to coupled said digital data communication path and being controlled by a DMA controller of a digital signal processor, and wherein said input register has an input coupled to said digital data communication path and is operative under DMA control of said DMA controller to temporarily store data bytes associated with successive time slots of said digital data stream, said digital signal processor includes memory, and wherein said DMA controller has a source address counter and a destination address counter, said source address counter pointing to one of said input register and an address in said memory from which data is to be accessed, and wherein said destination address counter points to one of an address in said memory and said output register to which data is to be written.

17. A delay mechanism according to claim 16, wherein said arrangement path further includes and a temporary holding register, and wherein DMA-controlled data transfers between said input register and said memory are effected through said temporary holding register, and wherein DMA-controlled data transfers between said memory and said output register are effected through said temporary holding register.

18. A delay mechanism according to claim 17, wherein said DMA controller is operative to cause said cascaded arrangement to impart said prescribed delay in four DMA transfer cycles.

19. A delay mechanism according to claim 18, wherein, during a first DMA-transfer cycle, the count value stored in said source address counter is defined so as to cause said DMA controller to effect a data transfer from said input register to said temporary holding register.

20. A delay mechanism according to claim 19, wherein, during a second DMA-transfer cycle, said DMA controller is operative to effect a data transfer from said temporary holding register to that location in said memory specified in aid destination address counter.

21. A delay mechanism according to claim 20, wherein, during a third DMA-transfer cycle, the count value stored in said source address counter is defined so as to cause said DMA controller to effect a data transfer from that location in memory specified by said source address counter to said temporary holding register.

22. A delay mechanism according to claim 21, wherein, during a fourth DMA-transfer cycle, the count value stored in said destination register is defined to cause said DMA controller to effect a data transfer from said temporary holding register to said output register.

23. A delay mechanism according to claim 22, wherein said DMA controller is operative to increment said source and destination address counters during alternate ones of said DMA-transfer cycles.

24. For use with a time division multiplexed digital communication network through which time division multiplexed data signals are routed over respectively different transmission paths of said digital communication network, which paths have respectively different transmission delays, to a bonding receiver at a destination end of said network, said bonding receiver including a digital signal processor for controlling the operation thereof, a method of effecting timeslot interleaving alignment of time division multiplexed data signals that have been routed over respectively different transmission paths of said digital communication network on a communication path upstream of said bonding receiver comprising the steps of:

(a) coupling an auxiliary delay path to said communication path upstream of said bonding receiver;

(b) controllably causing said auxiliary delay path to impart a prescribed delay to time slots of one of said digital communication signals routed over said network; and (c) controllably multiplexing time slots of said one of said digital communication signals routed over said network and controllably delayed in step (b) with time slots of other digital communication signals conveyed over said communication path, and applying the resultant combined signal to an input to said bonding receiver.

25. For use with a time division multiplexed digital communication network through which time division multiplexed data signals having the same transmission rate are routed over respectively different transmission paths of said digital communication network at said same transmission rate, which paths have respectively different transmission delays, to a bonding receiver at a destination end of said network, said bonding receiver including a digital signal processor for controlling the operation thereof, a method of effecting timeslot interleaving alignment of time division multiplexed data signals that have been routed over respectively different transmission paths of said digital communication network on a communication path upstream of said bonding receiver comprising the steps of:

(a) coupling an auxiliary delay path to said communication path upstream of said bonding receiver;

(b) controllably causing said auxiliary delay path to impart a prescribed delay to time slots of one of said digital communication signals routed over said network; and (c) controllably multiplexing time slots of said one of said digital communication signals routed over said network and controllably delayed in step (b) with time slots of other digital communication signals conveyed over said communication path, and applying the resultant combined signal to an input to said bonding receiver.

26. A method according to claim 25, wherein said auxiliary delay path comprises a cascaded arrangement of an input register, a controlled delay unit and an output register, each of which is controlled by said DMA controller of said digital signal processor.

27. A method according to claim 26, wherein said input register has an its input coupled to said data communications path from said network, and is operative under DMA control to temporarily store data bytes associated with successive time slots of a relatively faster channel routed through said network.

28. A method according to claim 27, wherein said digital signal processor includes memory, and wherein said DMA controller has a source address counter and a destination address counter, said source address counter pointing to one of said input register and an address in said memory from which data is to be accessed, said destination address counter pointing to one of an address in said memory and said output register to which data is to be written.

29. A method according to claim 28, wherein said auxiliary delay path further includes a temporary output holding register, and wherein DMA-controlled data transfers between said input register and said memory are effected through said temporary holding register, and wherein DMA-controlled data transfers between said memory and said output register are effected through said temporary holding register.

30. A method according to claim 29, wherein, in step (b), during a first DMA-transfer cycle, the count value stored in said source address counter is defined so as to cause said DMA controller to effect a data transfer from said input register to said temporary holding register, during a second DMA-transfer cycle, said DMA controller is operative to effect a data transfer from said temporary holding register to that location in said memory specified in said destination address counter, during a third DMA-transfer cycle, the count value stored in said source address counter is defined so as to cause said DMA controller to effect a data transfer from that location in memory specified by said source address counter to said temporary holding register, and during a fourth DMA-transfer cycle, the count value stored in said destination register is defined to cause said DMA controller to effect a data transfer from said temporary holding register to said output register.

31. A method according to claim 30, wherein said DMA controller is operative to increment said source and destination address counters during alternate ones of said DMA-transfer cycles.

32. A method according to claim 30, wherein the amount of delay imparted by said auxiliary delay path is defined in accordance with the difference between count values of said source address counter and said destination address counter.

33. A delay mechanism for imparting a prescribed delay to digital data stream being transmitted over a digital data communication path, comprising a cascaded arrangement of an input store, an addressable memory and an output store, said cascaded arrangement being coupled to said digital data communication path and being controlled by a DMA controller of a digital signal processor, said DMA controller having a source address counter and a destination address counter, and being operative to selectively access data from one of said input store and an address in said memory in dependence upon a prescribed portion of the contents of said source address counter, and being operative to selectively cause data to be transferred to one of an address in said memory and said output store in dependence upon a prescribed portion of the contents of said destination address counter, and wherein said input store includes an input register coupled to said digital data communication path, and a temporary input holding register coupling said input register to said memory, and wherein said output store includes and output register and a temporary output holding register coupling said memory to said output register, and wherein DMA-controlled data transfers between said input register and said memory are effected through said temporary input holding register, and wherein DMA-controlled data transfers between said memory and said output register are effected through said temporary output holding register.

34. A delay mechanism according to claim 33, wherein each of the prescribed portion of the contents of said source address counter and the prescribed portion of the contents of said destination address counter corresponds to the least significant bit thereof.

35. A delay mechanism according to claim 33, wherein said DMA controller is operative to cause said cascaded arrangement to impart said prescribed delay in four DMA transfer cycles.

36. For use with a time division multiplexed digital communication network through which time division multiplexed data signals having the same transmission frequency are routed over respectively different transmission paths of said digital communication network, which paths have respectively different transmission delays, to a bonding receiver at a destination end of said network, said bonding receiver including a digital signal processor for controlling the operation thereof, a method of effecting timeslot interleaving alignment of time division multiplexed data signals that have been routed over respectively different transmission paths of said digital communication network on a communication path upstream of said bonding receiver comprising the steps of:

(a) coupling a plurality of respectively different auxiliary delay paths to said communication path upstream of said bonding receiver;

(b) controllably causing said auxiliary delay paths to impart respectively different delays to time slots of said digital communication signals routed over said network; and (c) controllably multiplexing time slots of digital communication signals routed over said network and controllably delayed in step (b) with time slots of other digital communication signals conveyed over said communication path, and applying the resultant combined signals to an input to said bonding receiver.

37. A method according to claim 36, wherein step (b) comprises controlling each of said auxiliary delay paths by means of a respective direct memory access (DMA) controller.

38. A method according to claim 36, wherein a respective auxiliary delay path comprises a cascaded arrangement of an input register, a controlled delay unit and an output register, each of which is controlled by a DMA controller.

39. A method according to claim 38, wherein said input register has an its input coupled to said data communications path from said network, and is operative under DMA control to temporarily store data bytes associated with successive time slots of a relatively faster channel routed through said network.

40. A method according to claim 39, wherein said digital signal processor includes memory, and wherein said DMA controller has a source address counter and a destination address counter, said source address counter pointing to one of said input register and an address in said memory from which data is to be accessed, said destination address counter pointing to one of an address in said memory and said output register to which data is to be written.

41. A data transfer apparatus comprising a cascaded arrangement of an input store, an addressable memory and an output store, said cascaded arrangement being controlled by a DMA controller of a digital signal processor, said DMA controller having a source address counter, a destination address counter and a temporary store, and being operative to effect a data transfer from said input store to said temporary store in response to the count value stored in said source address counter having a first attribute, to effect a data transfer from said temporary store to that location in said memory specified in said destination address counter in response to the count value stored in said destination address counter having a second attribute, to effect a data transfer from that location in memory specified by said source address counter to said temporary store in response to the count value stored in said source address counter having said second attribute, and to effect a data transfer from said temporary store to said output register in response to the count value stored in said destination register having said first attribute.

42. A data transfer apparatus according to claim 41, wherein said first attribute corresponds to one of an odd or even count value, and said second attribute corresponds to an other of an odd or even count value.

43. A data transfer apparatus according to claim 41, wherein said DMA controller is operative to modify contents of said source and destination address counters during alternate DMA-transfer cycles.

44. A data transfer apparatus comprising a cascaded arrangement of an input store, an addressable memory and an output store, said cascaded arrangement being controlled by a DMA controller of a digital signal processor, said DMA controller having a source address counter, a destination address counter and a temporary store, and being operative to effect a data transfer from said input store to said temporary store during a first DMA-transfer cycle of said DMA controller, to effect a data transfer from said temporary store to that location in said memory specified in said destination address counter during a second DMA-transfer cycle of said DMA controller, to effect a data transfer from that location in memory specified by said source address counter to said temporary store during a third DMA-transfer cycle of said DMA controller, and to effect a data transfer from said temporary store to said output register during a fourth DMA-transfer cycle of said DMA controller.

45. A data transfer apparatus according to claim 44, wherein said DMA controller is operative to modify address values of said source and destination address counters during alternate DMA-transfer cycles.

* * * * *